United States Patent [19]
Karpinski, Jr.

[11] Patent Number: 5,450,197
[45] Date of Patent: Sep. 12, 1995

[54] DEVICE AND METHOD FOR REDUCING ANGULAR RANDOM WALK IN A RING LASER GYROSCOPE

[75] Inventor: Andrew J. Karpinski, Jr., Clearwater, Fla.

[73] Assignee: Honeywell Inc., Minneapolis, Minn.

[21] Appl. No.: 115,190

[22] Filed: Aug. 31, 1993

[51] Int. Cl.[6] .................................... C01C 19/68
[52] U.S. Cl. ................................................ 356/350
[58] Field of Search .......................... 356/350; 372/94

[56] References Cited

U.S. PATENT DOCUMENTS

| | | | |
|---|---|---|---|
| 4,152,071 | 5/1979 | Podgonski | 356/350 |
| 4,422,762 | 12/1983 | Hotchings et al. | 356/350 |
| 4,473,297 | 9/1984 | Simpson et al. | 356/350 |
| 4,653,919 | 3/1987 | St. Jean et al. | 356/350 |
| 5,004,344 | 4/1991 | Tazanks et al. | 356/350 |

*Primary Examiner*—Samuel A. Turner
*Attorney, Agent, or Firm*—Craig J. Lervick

[57] ABSTRACT

A ring laser gyroscope system includes light intensity detecting devices for detecting intensity of laser beams in the gyroscope. A computer processes the output and calculates the amount of backscatter in each beam. The measurement of backscatter is used to calculate the amount of movement required of mirrors in the gyroscope to change the path length of the laser beams an amount sufficient to minimize the backscatter in each. By minimizing backscatter, random walk of the laser beam is reduced.

14 Claims, 1 Drawing Sheet

DEVICE AND METHOD FOR REDUCING ANGULAR RANDOM WALK IN A RING LASER GYROSCOPE

FIELD OF THE INVENTION

This invention relates to a device and method for reducing angular random walk in a ring laser gyroscope.

BACKGROUND OF THE INVENTION

Ring laser gyroscopes have been in use in industries such as the aerospace industry to measure change of position of a platform on which they are mounted, for example, on aircraft. Typically, such devices operate by generating two laser beams travelling in opposite directions within a closed-loop cavity. One example of such a device has a three-sided path which is defined by a laser-light generating gas-containing chamber, with mirrors located at the corners of each of the paths to reflect laser beams travelling therein in a new direction along a different path of a cavity within the device.

The frequency of the laser beams is very high, approximately, for example, 500 Terahertz for a helium-neon laser. This frequency is much higher than the response of, for example, typical light detecting diodes, frequently referred to as photodiodes, and their associated electronics employed in such gyroscopes. Consequently, only the average intensity of the laser beams appears at the output of a photodetector and its associated electronics, and it appears as a DC (direct current) signal.

If the gyroscope is at rest, then the frequencies of the two laser beams are identical. But if there is a large angular input rate applied to the input axis of the gyroscope, the two laser beams assume different frequencies, with the difference in the frequencies being approximately proportional to the applied input rate. If the two laser beams are then combined (interfered) with each other, a beat frequency equal to the frequency difference between the laser beams results. In a typical ring laser gyroscope, this beat frequency is within the bandwidth capabilities of the photodetectors and their associated electronics, and appears as an AC (alternating current) component riding on top of the DC signal that is due to the average intensity of the laser beams. In a ring laser gyroscope, the two laser beams are purposely interfered with each other to generate this beat frequency, which, for example, is detected with photodiodes to provide a signal on which the frequency of the AC component is proportional to input rate.

In order to determine the direction of rotational movement of the gyroscope or object upon which it is mounted, i.e., rotation in either clockwise or counterclockwise direction, the two diodes are employed to detect a phase shift at 90° from each other. In accordance with the output, in addition to the detected change in interference, the measurement from the diodes is then used to determine whether the direction of movement is in a clockwise or counterclockwise rotation.

Those of ordinary skill in the art recognize that, if there is any scattering within the lasing cavity of a ring laser gyroscope so that a portion of one of the beams couples into the other beam, there is a tendency for the phases of the two beams to pull towards each other. This pulling effect is most apparent when the frequencies and phases of the two laser beams travelling in opposite directions within the same cavity are close to each other, such as when the input rate approaches zero. This pulling of the frequencies and the phases of the two beams towards each other, frequently referred to as lock-in, results in an error in the output of the gyroscope.

One means available in the prior art to reduce this pulling between the beams is to modulate the ring laser gyroscope about its input axis in a periodic fashion, this modulation frequently being referred to as dither, as discussed in U.S. Pat. No. 3,373,650 issued Mar. 19, 1968 to J. E. Killpatrick, and assigned to the same assignee as that of the present invention. This patent teaches that this dither motion reduces this lock-in effect the majority of the time. A further development in reducing such pulling between laser beams is disclosed in U.S. Pat. No. 3,467,472, also issued to J. E. Killpatrick and assigned to the same assignee as that of the present invention, which teaches that the error due to lock-in can be further reduced by randomizing the oscillation or dithering of the beams so that the small errors in the extremities of the oscillation are no longer cumulative. However, those of ordinary skill in the art recognize that, even with the significant benefits derived from the utilization of the teachings of these two mentioned techniques of U.S. Pat. Nos. 3,373,650 and 3,467,472, there is still a small error in the angular output of the ring laser gyroscope which manifests itself as a drift with the characteristics of a statistical random walk. This angular random walk error, of necessity, affects the accuracy of the measurements being conducted.

U.S. Pat. No. 4,152,071, issued May 1, 1979 to T. J. Podgorski and assigned to the same assignee as the present invention, teaches that random walk can be reduced by shifting the position of the mirrors in the gyroscope so as to change the position of the path that the laser beams traverse within the lasing cavity of the ring laser gyroscope. By shifting the position of some of the mirrors, for example, one mirror can be shifted inwardly while another can be shifted outwardly, it is possible to reduce the random drift or angular random walk of the gyroscope while maintaining the same laser path length. This is accomplished because the new path that the laser beams traverse moves the beams away from any sources of scatter within the lasing cavity.

Though the techniques discussed in U.S. Pat. No. 4,152,071 generally do reduce the random drift of a ring laser gyroscope, those skilled in the art recognize that these techniques have certain limitations. For example, if the input rate applied to the ring laser gyroscope exceeds the peak dither rate, then the discriminant signal, referred to as the single beam signal, which is used to determine whether the gyroscope is operating at a minimum in angular random walk, as discussed in U.S. Pat. No. 4,152,071, is significantly reduced in amplitude so that the techniques discussed in U.S. Pat. No. 4,152,071 are no longer practically useable. In addition, the modulation discussed in U.S. Pat. No. 4,152,071, of necessity periodically moves the path that the laser beams traverse from that which results in minimal random walk. Further, the response of circuits using the techniques discussed in U.S. Pat. No. 4,152,071 is limited by the response of the integrator employed therein.

In accordance with this present invention, the problems of the prior art are either minimized or avoided and it becomes possible to minimize the amount of angular random walk in accordance with a very precise method and specific arrangement of components which, in addition, provides great flexibility to the method and device used to reduce such angular random walk.

SUMMARY OF THE INVENTION

In accordance with the invention, the amount of backscatter present in the laser beams in a ring laser gyroscope is minimized to reduce the amount of random walk. Specifically, if one or more photodetectors are positioned so that each photodetector is in the direct path of only one of the laser beams, the output of each photodetector should be a pure DC signal if there is no backscatter. If there is any backscatter of one of the laser beams back into the other, an AC component will appear on the DC signal, with the magnitude of the AC component, frequently referred to as the single beam signal by those of ordinary skill in the art, being proportional to the amount of backscatter. If the magnitude of the AC component is reduced, then the backscatter and, hence, the angular random walk, is also reduced.

Thus, in accordance with the invention the backscatter component in the laser beams is measured and the output thereof is processed by a computer to determine if the backscatter component is at a minimum level. In the event the backscatter is not at a minimum level, the computer conducts calculations to generate a control signal which is transmitted to transducers within the ring laser gyroscope to cause a change in the path, not a change in path length, of the beams an amount sufficient to minimize the backscatter component within one or the other or both laser beams.

Thus, in one aspect, the invention is directed to an improvement in a ring laser gyroscope system of the type having a ring laser gyroscope with moveable path length transducers therein. The transducers are associated with mirrors for moving the mirrors for shifting the path of the laser beams generated within the ring laser gyroscope cavity. A shift in the path of the laser beam is made in response to measurement of backscatter in the laser beam to minimize the backscatter component by selecting a path having the lowest measured backscatter.

Specifically, at least one laser intensity detecting device is positioned for detecting the intensity of only one of the laser beams in the ring laser gyroscope per detecting device, and for generating a measured output indicative of the intensity of the laser beam which is indicative of the backscatter component therein. Computing means then receives the output from the laser intensity detecting device to calculate the amount of backscatter in the laser beam, and for generating a calculated output based on said calculation to control and cause movement of path length transducers in the ring laser gyroscope to shift the position of the laser path an amount sufficient to minimize backscatter in the laser beam. Control means receives the calculated output and generates a signal to cause the path length transducers to move the respective mirrors into said position sufficient to minimize backscatter in the laser beam travelling in a defined path in the ring laser gyroscope.

In a more specific aspect, the laser intensity detecting device is at least one power detecting photodiode. An amplifier is connected to the photodiode to amplify the output from the photodiode. A filter serves to filter out noise from the amplified output from the photodiode, and a peak detector detects a peak value in the filtered output and generates a corresponding direct current (DC) signal which is proportional to the amount of backscatter present in the laser beam being monitored.

In yet still more specific aspects, the device includes an analog-to-digital convertor which converts the output from the peak detector from an analog DC value to a digital output, and a computer receives the digital output from the analog-to-digital convertor to calculate, in a predetermined manner, the movement required of the mirrors through the action of the moveable path length transducers to minimize backscatter in the laser beams, and to generate a digital signal representative of the movement required. The digital signal transmitted to the control means is the resultant control signal employed to achieve the required movement of mirrors in the gyroscope to minimize backscatter. In a yet still more specific aspect, the laser intensity detecting means are two, positioned so that one laser intensity detecting means has light from the laser beam that is going clockwise around the gyroscope focused on it, while the other laser intensity detecting means has light from the laser beam going counterclockwise around the gyroscope focused on it, so that the backscatter present in each path of the respective laser beams is measured to achieve a more accurate result.

In another aspect, the invention is directed to an improvement in a method of measuring the change in position of a moving body through the use of a ring laser gyroscope carried by the body or of change in position of the gyroscope itself. Typically, such measurement of change in position is effected by measuring the change in interference patterns between two laser beams travelling in opposite directions within the ring laser gyroscope. The path of the laser beams are shifted selectively to reduce angular random walk of the laser beams. The improvement in accordance with the invention is a method of reducing or minimizing angular random walk and involves the steps of detecting the intensity of at least one laser beam with intensity detecting means, e.g., a photodiode, to result in a signal for the laser beam which is indicative of the amount of backscatter present in the laser beam. The measured signals which are indicative of backscatter are employed to calculate, in a predetermined manner, the shift in the path of the laser beam required to minimize backscatter which appears as an AC signal. In accordance with such calculations, the path of the laser beam is then shifted relative an amount sufficient to minimize the backscatter component measured therein.

In a more specific aspect, the calculations are conducted with a digital computer operating on data, the data being indicative of the measured amount of backscatter. The computer operates on the data with a predetermined software program to generate a control signal to cause the movable path length transducers to change the path of the laser beam to minimize backscatter.

The measurement of the amount of backscatter for each laser beam is conducted with at least one photodetector diode whose output is amplified and bandpass filtered to remove direct current offsets and noise. The filtered signal is then passed to a peak detector to operate thereon to generate a direct current signal which is representative of backscatter present in the laser beam having its intensity measured.

The direct current signal is then converted to a digital signal and passed to a digital computer to be operated thereon with software to result in a control signal representative of the change in path length required for each laser beam to minimize backscatter therein. The control signal is then passed either directly or through intermediate control means to the moveable path length transducers in the system, with each one of the transducers being associated with mirrors, to cause the path length transducers to move the mirrors to change the path an amount sufficient to minimize backscatter in the laser beam.

In a yet still more specific aspect, the measurements can be conducted continuously to effect the movement and change in path in a manner approximating real-time, as in the prior art. Alternately, the measurements, calculations and resulting changes in the path the beams traverse can be done discontinuously, that is, performed at time spaced intervals with the last calculated change in the path held between the measurements and calculations, a capability not available in the prior art. This has the advantage over the prior art in that any modulation of the path the beams traverse necessary to determine whether the gyroscope is operating at a random walk minimum is only performed during the measurements and not continuously, as with the prior art. The result is that the average of any errors due to this modulation is smaller, since the modulation is performed less frequently with a lower overall duty cycle. An example of another advantage of being able to perform these tasks discontinuously is that if the AC signal is lost due to, for example, a burst of noise or an external input rate that exceeds the peak dither rate, the computer can continue to output the last calculated command until the AC signal is again present.

Another advantage provided by this invention is that the computer employed allows for the response time of the control to be varied over time and operating conditions. With the prior art, the response time of the control for minimum random walk is limited by the time constant of the integrator. Since this integrator time constant cannot easily be modified in an operating circuit, the time constant of the integrator is set for a compromise between the fastest and slowest desired response times over the anticipated operating conditions. However, the computer allows for different response times for different operating conditions. This results in less error in maintaining the minimum random walk.

BRIEF DESCRIPTION OF THE DRAWINGS

Having generally described the invention, the same will become better understood from the following brief description of the drawing taken in conjunction with the detailed description of the invention which follows, wherein.

DETAILED DISCUSSION OF THE INVENTION

Figure 1:
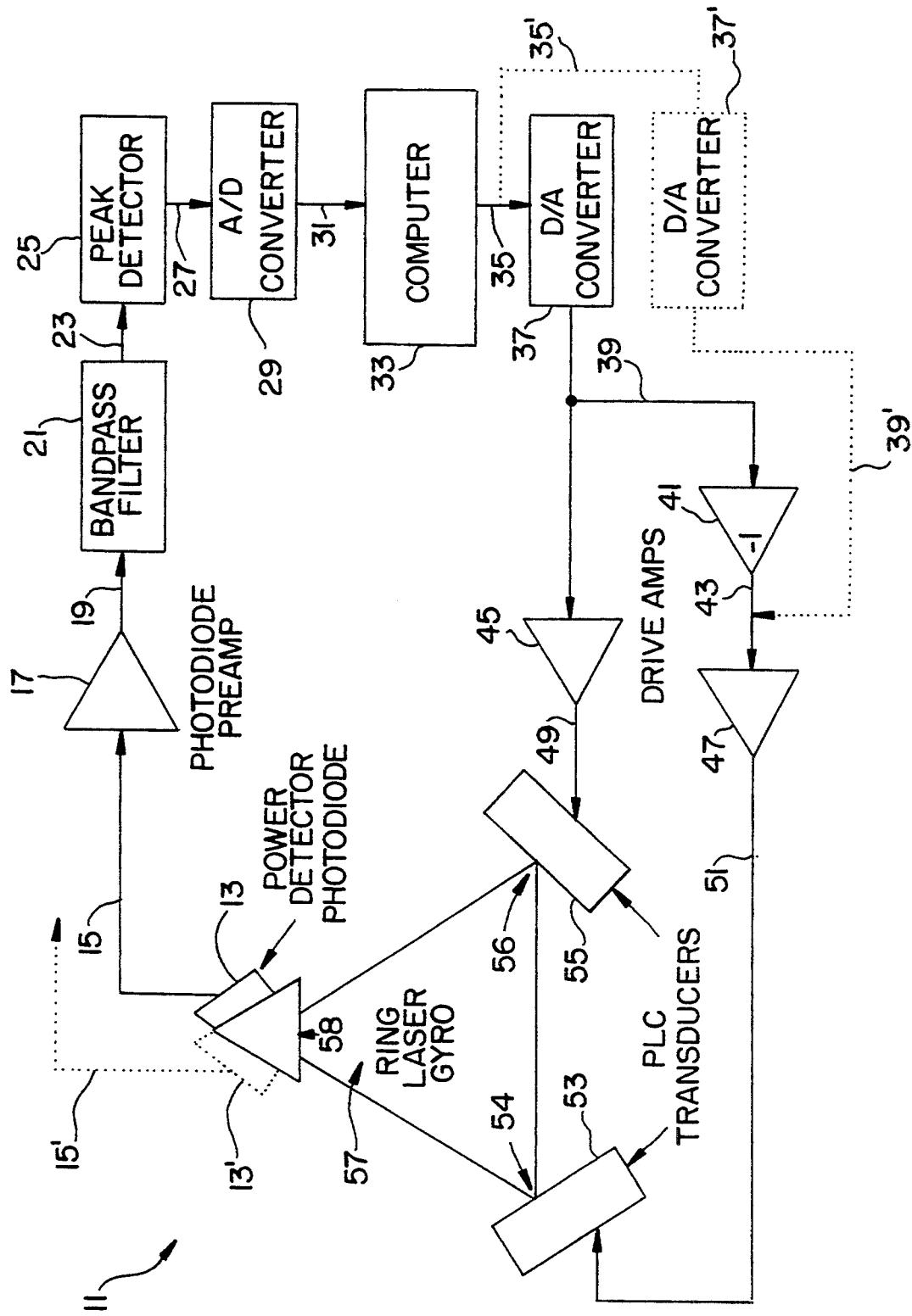
FIG. 1 is a schematic circuit diagram of a system for detecting backscatter component in laser beams in a ring laser gyroscope to calculate optimum path shift to minimize angular random walk.

FIG. 1 generally illustrates one embodiment of a system 11 in accordance with the invention. The basis for the system 11 is a conventional ring laser gyroscope 57 of the type which is presently commercially available from a number of sources and well known to those of ordinary skill in the art. While a three-sided ring laser gyroscope 57 is illustrated, it will be appreciated that other alternative constructions such as, for example, four-sided gyroscopes, can also be employed within a system in accordance with the invention.

The ring laser gyroscope 57 includes mirrors 54 and 56 at two corners connected to moveable transducers 53, 55 and 58 at a fixed position corner, and arranged in a conventional manner to reflect two laser beams travelling in opposite directions within the gyroscope 57. At the fixed mirrors 58 corner there is also at least one power detecting photodiode 13 which detects the intensity, and thus, also the backscatter component of light within at least one of the laser beams. A second diode 13' shown in broken lines can also be arranged at the same corner as the first diode 13 and connected to a computer in a parallel arrangement through line 15' as the first diode 13 with like elements, as will be readily apparent from the following discussion. If a second photodiode 13' is employed then the backscatter in both laser beams can be measured, one beam being measured by photodiode 13 and the other beam being measured by photodiode 13'. Typically, at the location of the diode 13, there is a fixed mirror 58 which is partially transparent to allow the diode 13 and diode 13', optionally, to detect the intensity of the beams travelling in the gyroscope 57 cavity.

Typically, when in operation, the light intensity of the two laser beams within the ring laser gyroscope 57 is detected by the power detector photodiode 13 and/or 13' and the output thereof transmitted through connecting line 15 and/or 15' to a photodiode preamplifier 17 wherein it is preamplified, passed through line 19 to a bandpass filter 21 to remove direct current (DC) offset therein and to limit noise in a conventional manner.

As previously noted, although one photodiode 13 is shown with a second diode 13' shown in broken lines, other photodiodes can be associated with transducers 53 and 55 so as to have multiple photodiodes.

The signal from the bandpass filter 21 is passed through line 23 to a peak detector 25, typically a half-wave rectifier of conventional construction to result in a DC signal that is proportional to the component of backscatter present, i.e., as a result of detecting the AC component present in the laser beam or beams within the ring laser gyroscope 57. The signal from the peak detector 25 is then passed through line 27 into an analog to digital convertor 29 for conversion to digital form and the output therefrom is passed through line 31 into a computer 33 for processing through predetermined software.

The software, in accordance with the amount of backscatter present, is used to calculate the shift in the path of the laser beams (without changing path length) which is required by movement of the mirrors 54 and 56 associated with transducers 53 and 55. The calculated value from the computer is passed as a control signal through line 35 to a digital-to-analog convertor 37 wherein it is converted back to analog form and passed through lines 39 to respective drive amplifier 41, which is an inverting amplifier driving out of phase in a conventional manner to ensure correct movement of transducer 53 by passing the inverted control signal through line 43 and drive amplifier 47 through line 51 to transducer 53. A non-inverted control signal is passed through drive amplifier 45 through line 49 to transducer 55. The signals cause the transducers to move their corresponding mirrors to shift the path in accordance with the calculated value.

Alternatively, it is also possible to use two digital-to-analog convertors 37 and 37' (as shown in dashed lines), deleting invertor 41. Digital-to-analog convertor 37 would drive amplifier 45 with a direct connect thereto, and with line 39' replacing line 39. the second digital-to-analog convertor 37' then connects to convertor 33 at line 35' and directly to drive amplifier 47. The computer 33 in this embodiment then sends the inverse of the command sent to one digital-to-analog convertor 37 or 37' as sent to the other digital-to-analog convertor 37 or 37'. This implementation provides a number of advantages in that 1) the same computer and digital-to-analog convertors can be employed for path length control, and 2) an offset can be applied to the path length control at power-up to ensure that the same power mode and hence, the same scale factor is acquired.

With respect to the calculations conducted within the computer 33, a number of techniques may be employed to minimize the backscatter component in the laser beams. A first technique involves having the computer apply a small incremental value to the output of sensor 13 which is passed to the digital-to-analog convertor 37. If the result of applying the incremental value causes the backscatter to decrease, the computer then continues to increment the output the same amount in the same direction. This continues until an increase is noticed in the backscatter component at which time a decremental value and likewise reversing incremental value are sequentially applied in smaller and smaller amounts until an optimum level of backscatter component detected is reached.

An alternative arrangement involves recording the initial output drive to the digital-to-analog convertor 37 and the amplitude of the backscatter component detected by power detection photodiode 13 through peak detector 25. The computer 33 then increments the output in one direction and records the new values of the output drive and the backscatter component. A second increment to the output is then applied and the new output and backscatter component values are recorded. The optimum wave form to fit the three data points is then calculated and the result is a curve that describes the change in the backscatter component with the output drive in a calculated, as opposed to real-time, manner. A computer 33 then calculates, in accordance with predetermined software, the output drive that from the calculated curve would result in the minimum backscatter component and thus minimum angular random walk. Temperature can also be monitored continuously, and an adjustment of the curve can be made over time in response to a change in temperature.

Having thus described the invention the same will become better understood from the attached claims which are set forth in a nonlimiting manner.

What is claimed is:

1. In a ring laser gyroscope system having a ring laser gyroscope of the type having movable path length transducers associated with mirrors, said transducers being controllable for shifting the path of laser beams generated within said ring laser gyroscope for conducting change of position measurements therewith, the improvement comprising:

at least one laser intensity detecting means for detecting the intensity of laser beams in said ring laser gyroscope and for generating a measured output indicative of the intensity of said laser beams;

computing means for receiving the output from said at least one laser intensity detecting means, for calculating the amount of backscatter in said laser beams and for generating a calculated output based on said calculation to cause movement of mirrors associated with said path length transducers to shift the laser beam path an amount sufficient to minimize backscatter in said laser beams; and control means for receiving said calculated output for causing said movable path length transducers to move their respective mirrors into a position wherein backscatter in said laser beams travelling in defined paths in said ring laser gyroscope is minimized.

2. A gyroscope system as in claim 1 wherein said at least one laser intensity detecting means comprises at least one power detecting photodiode.

3. A gyroscope system as in claim 2 further comprising: photodiode amplifying means for amplifying output from said power detecting photodiode;

filter means for filtering noise from the amplified output from said photodiode amplifying means; and peak detecting means for detecting a peak value in the filtered amplified output from said filter means to generate a DC signal which is proportional to the amount of backscatter present in the laser beams having the intensity thereof detected by said at least one laser intensity detecting means.

4. A gyroscope system as in claim 3 further comprising an analog to digital converter connected to said peak detecting means for converting the output thereof from an analog DC value to a digital output, and said computing means being a digital computer for receiving the output from said analog to digital converter for calculating, in a predetermined manner, the movement required of said movable path length transducers to minimize backscatter in said laser beams and generating a digital signal representative of the movement required of said path length transducers to control movement of mirrors thereof to minimize backscatter.

5. A gyroscope system as in claim 1 wherein said ring laser gyroscope is a three-sided gyroscope and wherein said at least one laser intensity detecting means is located at the convergence of two sides thereof.

6. A gyroscope system as in claim 5 wherein said at least one laser intensity detecting means comprises two laser intensity detecting means, each respective one of said two laser intensity detecting means being located at opposite sides of a corner of said three-sided gyroscope for measuring the intensity respectively in counter-rotating laser beams in the gyroscope.

7. A gyroscope system as in claim 4 further comprising:

digital-to-analog converting means for converting the digital output from said digital computer into an analog signal, and drive amplifier means for amplifying said analog signal, and providing said amplified analog signal to said path length transducers for causing movement thereof in an amount sufficient to minimize backscatter on the laser beams within the paths thereof.

8. In a method of measuring the change in position of a moving body through the use of a ring laser gyroscope carried by said body, by measuring the change in interference patterns between two laser beams travelling in opposite directions within the ring laser gyroscope, and wherein the paths of said laser beams are selectively shifted to minimize pulling between the respective beams resulting in angular random walk, the improvement wherein angular random walk is minimized by the steps of:

detecting the intensity of each laser beam in said diode to result in a signal for each laser beam which is indicative of the amount of backscatter present in each laser beam;

calculating, based on said signals indicative of backscatter, in a predetermined manner, the shift in the path of each respective laser beam relative to the other required to minimize backscatter; and shifting the path of the laser beams in accordance with the calculated amount of change to minimize backscatter.

9. A method as in claim 8 comprising conducting said calculation with a digital computer operating on data indicative of said measured values through the operation on said data with predetermined program.

10. A method as in claim 9 further comprising:

conducting the steps detecting of the intensity of each laser beam with at least one power detector photodiode;

amplifying an output from said photodiode which is representative of laser beam intensity;

bandpass filtering said output to remove direct current offsets in said signal and to eliminate noise;

passing said filtered signal to a peak detector to operate thereon to generate a direct current signal which is representative of backscatter present in the laser beams whose intensity is being detected; and converting said direct current signal to a digital signal and passing said digital signal to be operated thereon by said digital computer to result in a control signal representative of the shift in path length required to minimize angular random walk.

11. A method as in claim 10 further comprising passing said control signal to path length transducers associated with mirrors in said ring laser gyroscope to cause said path length transducers to move said mirrors an amount sufficient to minimize backscatter in said laser beams.

12. A method as in claim 11 wherein said control signal generated by said digital computer is in digital form; and further comprising converting said control signal to analog form prior to transmitting the control signal to said path length transducer for control of movement thereof.

13. A method as in claim 8 further comprising conducting said intensity measurements and calculations continuously to effect said path length changes continuously thereby minimizing backscatter in a manner approximating real-time.

14. A method as in claim 8 further comprising conducting said intensity measurements at periodic intervals, measuring ambient temperature and calculating the amount of change of path length required over time by adjusting the calculated value based on intensity based on a correction factor representative of the effect of temperature on change in path length.

* * * * *